United States Patent
Lin et al.

(10) Patent No.: US 10,715,028 B2
(45) Date of Patent: Jul. 14, 2020

(54) FLYBACK POWER CONVERTER AND ZVS CONTROL CIRCUIT AND CONTROL METHOD THEREOF

(71) Applicant: RICHTEK TECHNOLOGY CORPORATION, Zhubei, Hsinchu (TW)

(72) Inventors: Tzu-Chen Lin, Changhua (TW); Kun-Yu Lin, Hsinchu (TW); Li-Di Lo, Taichung (TW); Wei-Hsu Chang, New Taipei (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 0 days.

(21) Appl. No.: 16/586,916

(22) Filed: Sep. 28, 2019

(65) Prior Publication Data

US 2020/0153327 A1     May 14, 2020

Related U.S. Application Data

(60) Provisional application No. 62/757,734, filed on Nov. 8, 2018.

(30) Foreign Application Priority Data

May 10, 2019   (CN) .......................... 2019 1 0388025

(51) Int. Cl.
    *H02M 3/335*     (2006.01)
    *H02M 1/08*     (2006.01)

(52) U.S. Cl.
    CPC ....... *H02M 1/083* (2013.01); *H02M 3/33592* (2013.01)

(58) Field of Classification Search
    CPC .... H02M 1/08; H02M 1/083; H02M 3/33523; H02M 3/33592; H02M 3/33507;
(Continued)

(56) References Cited

U.S. PATENT DOCUMENTS

6,049,471 A * 4/2000 Korcharz .......... H02M 3/33592
    363/20
6,052,389 A * 4/2000 Kim .................... H04L 49/3081
    370/516
(Continued)

*Primary Examiner* — Adolf D Berhane
(74) *Attorney, Agent, or Firm* — Tung & Associates (57) ABSTRACT

A ZVS (zero voltage switching) control circuit for controlling a flyback power converter includes: a primary side controller circuit for generating a switching signal, to control a primary side switch; and a secondary side controller circuit for generating a synchronous rectifier (SR) control signal for controlling a synchronous rectifier switch. The SR control signal includes an SR-control pulse and a ZVS pulse. The SR-control pulse controls the synchronous rectifier switch to perform secondary side synchronous rectification. The secondary side controller circuit determines a trigger timing point of the ZVS pulse according to a waveform characteristic of a ringing signal, to control the synchronous rectifier switch to be ON for a predetermined period, thereby achieving zero voltage switching of the primary side switch. The primary side or the secondary side controller circuit includes a jitter controller for performing jitter control on the ZVS pulse.

30 Claims, 6 Drawing Sheets

(58) Field of Classification Search
CPC ......... H02M 3/33576; H02M 3/33569; H02M 3/325; H02M 3/24; H02M 3/335; H03K 5/19

See application file for complete search history.

(56) References Cited

U.S. PATENT DOCUMENTS

| | | | |
|---|---|---|---|
| 10,014,786 B2* | 7/2018 | Yang | H02M 3/33592 |
| 10,292,226 B1* | 5/2019 | Shi | H02M 7/219 |
| 10,560,012 B1* | 2/2020 | Yang | H02M 3/33592 |
| 10,566,893 B2* | 2/2020 | Yang | H02M 3/33592 |
| 10,601,329 B2* | 3/2020 | Chang | H02M 3/33523 |
| 2011/0085359 A1* | 4/2011 | Gong | H02M 1/44 |
| | | | 363/21.18 |
| 2014/0003096 A1* | 1/2014 | Deng | H02M 3/33592 |
| | | | 363/21.14 |
| 2015/0035576 A1* | 2/2015 | Romano | H03K 5/131 |
| | | | 327/262 |
| 2016/0036340 A1* | 2/2016 | Kikuchi | H02M 1/32 |
| | | | 363/21.14 |
| 2016/0268901 A1* | 9/2016 | Nishijima | H02M 1/44 |
| 2018/0351463 A1* | 12/2018 | Werner | H02M 3/33561 |
| 2018/0358902 A1* | 12/2018 | Duvnjak | H02M 3/33592 |
| 2019/0097521 A1* | 3/2019 | Tao | H02M 7/217 |
| 2020/0099307 A1* | 3/2020 | Lo | H02M 3/33507 |
| 2020/0106365 A1* | 4/2020 | Werner | H02M 3/33561 |

\* cited by examiner

FLYBACK POWER CONVERTER AND ZVS
CONTROL CIRCUIT AND CONTROL
METHOD THEREOF

CROSS REFERENCE

The present invention claims priority to U.S. 62/757,734, filed on Nov. 8, 2018, and to CN 201910388025.6, filed on May 10, 2019.

BACKGROUND OF THE INVENTION

Field of Invention

The present invention relates to a flyback power converter and a Zero Voltage Switching (ZVS) control circuit and a control method thereof; particularly, it relates to such flyback power converter capable of achieving zero voltage switching condition. The present invention also relates to a ZVS control circuit for use in such flyback power converter and a control method of such flyback power converter.

Description of Related Art

Figure 1:
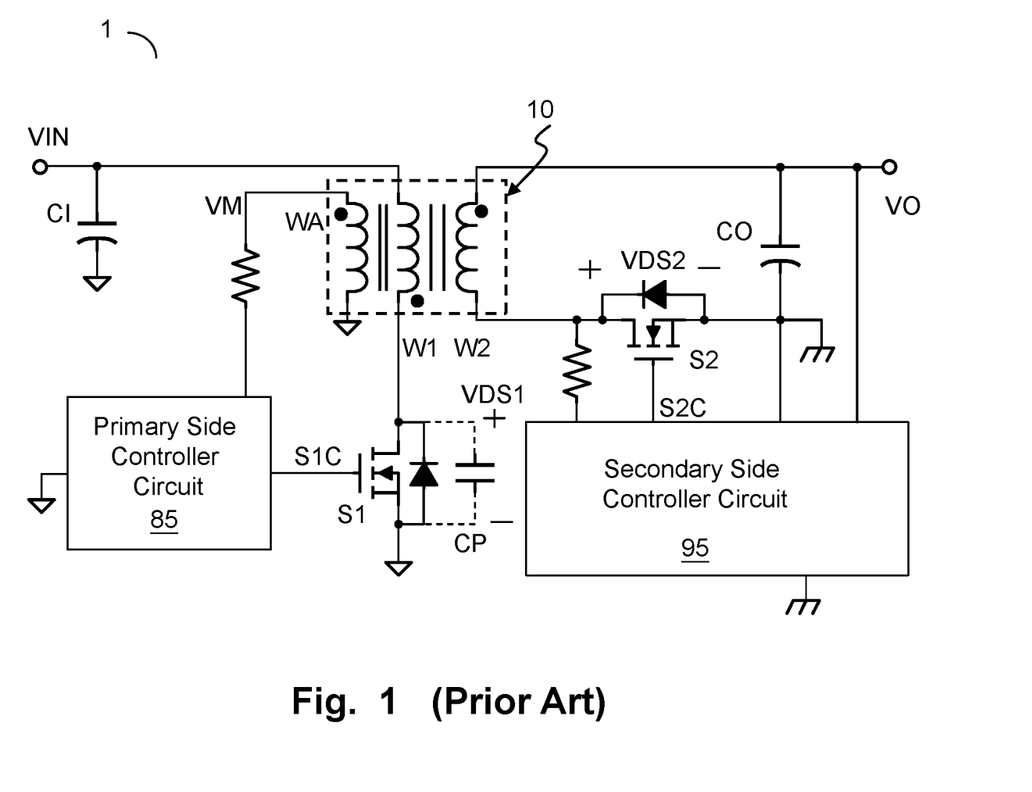
FIG. 1 shows a schematic diagram of a prior art flyback power converter.

FIG. 1 shows a prior art flyback power converter (flyback power converter 1), wherein a primary side controller circuit 85 controls a primary side switch S1 to operate the power transformer 10 so as to generate an output voltage VO. A secondary side controller circuit 95 generates a synchronous rectifier (SR) control signal S2C to control a synchronous rectifier switch S2 for performing synchronous rectification at the secondary side. The term "synchronous rectification" as described herein means that the synchronous rectifier switch S2 switches in substantially opposite phase to the primary side switch S1.

The prior art in FIG. 1 has a drawback that the synchronous rectifier switch S2 at the secondary side cannot be precisely synchronized with the primary side switch S1 at the primary side. Besides, the power conversion efficiency is low since the primary side switch S1 does not operate by zero voltage switching. The term "zero voltage switching" as described herein means that the primary side switch S1 is turned ON at a timing point when the voltage difference across its drain and source is substantially zero.

As compared to the prior art in FIG. 1, the present invention is advantageous in that: through a ringing signal, the synchronous rectifier switch S2 can be precisely synchronized with the primary side switch S1. Besides, the power conversion efficiency is greatly improved since the primary side switch S1 operates by zero voltage switching. Moreover, the present invention can perform jitter control on a ZVS pulse of a synchronous rectifier (SR) control signal, thereby reducing undesirable electromagnetic interference (EMI).

SUMMARY OF THE INVENTION

From one perspective, the present invention provides a zero voltage switching (ZVS) control circuit for use in a flyback power converter, the flyback power converter being configured to operably convert an input voltage to an output voltage, the ZVS control circuit comprising: a primary side controller circuit, which is configured to operably generate a switching signal to control a primary side switch, thereby controlling a primary side winding of a power transformer of the flyback power converter, wherein the primary side winding is coupled to the input voltage; and a secondary side controller circuit, which is configured to operably generate a synchronous rectifier (SR) control signal for controlling a synchronous rectifier switch, thereby controlling a secondary side winding of the power transformer to generate the output voltage, wherein the SR control signal includes an SR-control pulse and a ZVS pulse, wherein the SR-control pulse is configured to operably control the synchronous rectifier switch to be ON for an SR time period, to perform secondary side synchronous rectification; wherein, after the SR-control pulse ends, the secondary side controller circuit determines a trigger timing point of the ZVS pulse according to a waveform characteristic of a ringing signal, to control the synchronous rectifier switch to be ON for a predetermined ZVS time period, for achieving zero voltage switching of the primary side switch; wherein the ringing signal is related to a ringing current of the power transformer; wherein the primary side controller circuit or the secondary side controller circuit includes a jitter controller, which is configured to operably generate a jitter signal for performing jitter control on the ZVS pulse.

From another perspective, the present invention provides a flyback power converter, which is configured to operably convert an input voltage to an output voltage, the flyback power converter comprising: a power transformer coupled between the input voltage and the output voltage; a primary side switch coupled to a primary side winding of the power transformer, wherein the primary side winding is coupled to the input voltage; a synchronous rectifier switch coupled to a secondary side winding of the power transformer, wherein the secondary side winding is coupled to the output voltage; and a zero voltage switching (ZVS) control circuit including: a primary side controller circuit, which is configured to operably generate a switching signal to control a primary side switch, thereby controlling a primary side winding of a power transformer of the flyback power converter, wherein the primary side winding is coupled to the input voltage; and a secondary side controller circuit, which is configured to operably generate a synchronous rectifier (SR) control signal for controlling a synchronous rectifier switch, thereby controlling a secondary side winding of the power transformer to generate the output voltage, wherein the SR control signal includes an SR-control pulse and a ZVS pulse, wherein the SR-control pulse is configured to operably control the synchronous rectifier switch to be ON for an SR time period, to perform secondary side synchronous rectification; wherein, after the SR-control pulse ends, the secondary side controller circuit determines a trigger timing point of the ZVS pulse according to a waveform characteristic of a ringing signal, to control the synchronous rectifier switch to be ON for a predetermined ZVS time period, for achieving zero voltage switching of the primary side switch; wherein the ringing signal is related to a ringing current of the power transformer; wherein the primary side controller circuit or the secondary side controller circuit includes a jitter controller, which is configured to operably generate a jitter signal for performing jitter control on the ZVS pulse.

In one embodiment, the jitter controller generates the jitter signal via a random way, a pseudorandom way and/or by a predetermined time sequence.

In one embodiment, the secondary side controller circuit determines the trigger timing point of the ZVS pulse according to the waveform characteristic, so as to control the synchronous rectifier switch to be ON for the predetermined ZVS time period before the primary side switch is turned ON, so that under a steady state, the trigger timing point of the ZVS pulse is earlier than a trigger timing point of the switching signal by a predetermined time difference, thereby achieving zero voltage switching of the primary side switch; wherein the predetermined time difference is related to a ringing period of the ringing signal.

In one embodiment, the flyback power converter operates under a discontinuous conduction mode (DCM).

In one embodiment, the waveform characteristic includes a peak, a valley, a rising edge or a falling edge of the ringing signal.

In one embodiment, the jitter controller performs jitter control on the trigger timing point of the ZVS pulse.

In one embodiment, the jitter controller performs jitter control on a characteristic threshold of the waveform characteristic.

In one embodiment, the ringing signal includes a primary side voltage and/or a secondary side voltage, wherein the primary side voltage is a voltage between a current in-flow terminal and a current out-flow terminal of the primary side switch, whereas, the secondary side voltage is a voltage between a current in-flow terminal and a current out-flow terminal of the synchronous rectifier switch.

In one embodiment, the primary side voltage is obtained through a winding of the power transformer other than the primary side winding of the power transformer.

In one embodiment, the primary side controller circuit includes the jitter controller, wherein the jitter signal is transmitted to the secondary side controller circuit via a pulse transformer.

From yet another perspective, the present invention provides a control method of a flyback power converter, the control method being configured to operably control the flyback power converter to convert an input voltage to an output voltage, the control method comprising: generating a switching signal to control a primary side switch, thereby controlling a primary side winding of a power transformer, wherein the primary side winding is coupled to the input voltage; generating a synchronous rectifier (SR) control signal for controlling a synchronous rectifier switch, thereby controlling a secondary side winding of the power transformer to generate the output voltage, wherein the SR control signal includes an SR-control pulse and a ZVS pulse, wherein the SR-control pulse is configured to operably control the synchronous rectifier switch to be ON for an SR time period, to perform secondary side synchronous rectification; and performing jitter control on the ZVS pulse; wherein the step of generating the SR control signal includes: determining a trigger timing point of the ZVS pulse according to a waveform characteristic of a ringing signal, to control the synchronous rectifier switch to be ON for a predetermined ZVS time period, for achieving zero voltage switching of the primary side switch; wherein the ringing signal is related to a ringing current of the power transformer.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 2A:
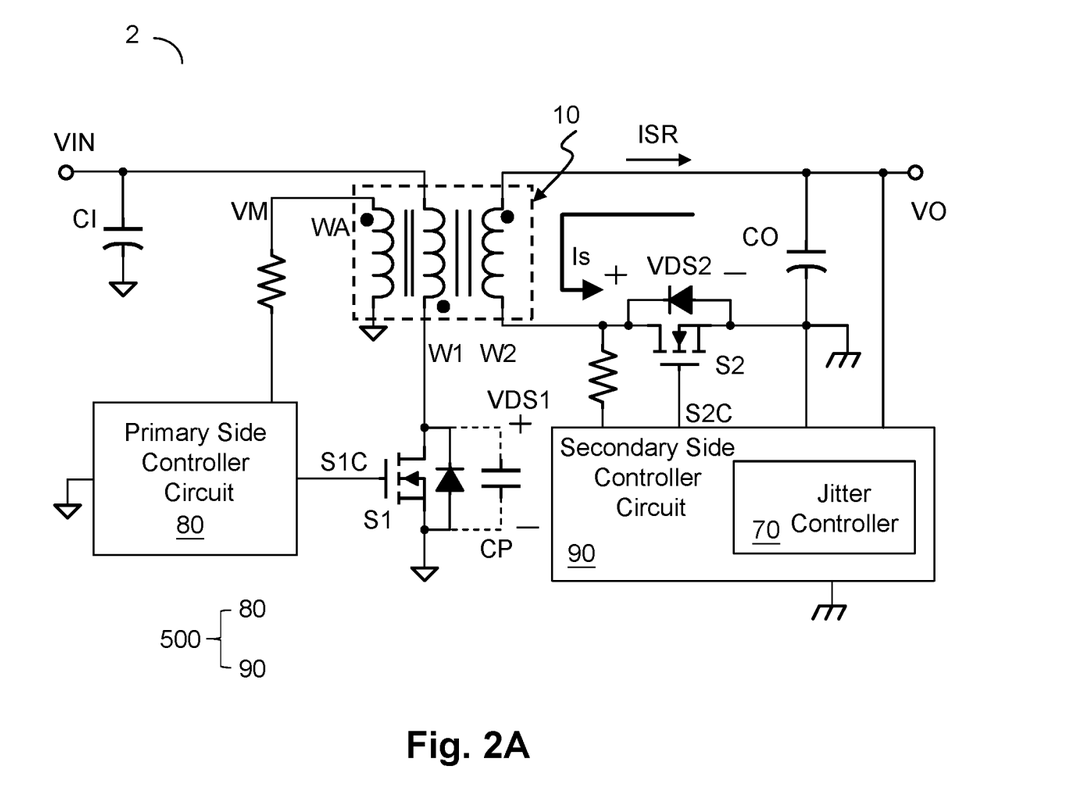
FIGS. 2A-2B show schematic diagrams of a ZVS control circuit for use in a flyback power converter according to embodiments of the present invention.

Please refer to FIG. 2A, which shows a schematic diagram of a ZVS control circuit (i.e., a ZVS control circuit 500) according to an embodiment of the present invention. In this embodiment, the ZVS control circuit 500 is for use in a flyback power converter 2, to control the flyback power converter 2 to convert an input voltage VIN to an output voltage VO. The flyback power converter 2 comprises: a power transformer 10, a primary side switch S1, a synchronous rectifier switch S2 and a ZVS control circuit 500. The ZVS control circuit 500 comprises: a primary side controller circuit 80 and a secondary side controller circuit 90. The primary side controller circuit 80 is configured to operably generate a switching signal S1C which operates a primary side switch S1 to control a primary side winding W1 of the power transformer 10; the primary side winding W1 is coupled to the input voltage VIN. The secondary side controller circuit 90 is configured to operably generate a synchronous rectifier (SR) control signal S2C which operates the synchronous rectifier switch S2 to control a secondary side winding W2 of the power transformer 10, to generate the output voltage VO.

Figure 3A:
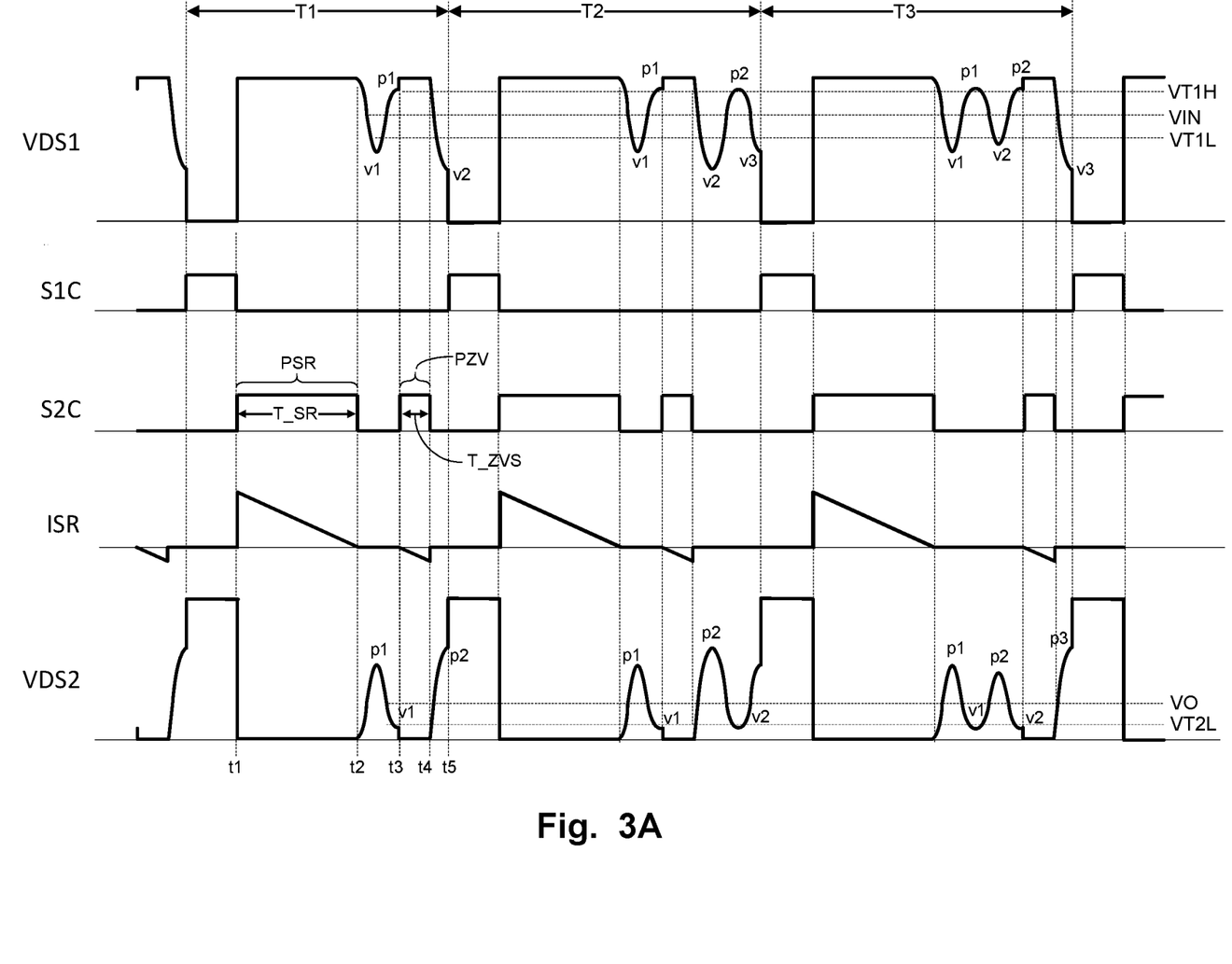
FIG. 3A shows waveforms corresponding to a ZVS control circuit of the present invention.

Please refer to FIG. 3A. FIG. 3A shows waveforms corresponding to a ZVS control circuit of the present invention. According to the present invention, the SR control signal S2C includes an SR-control pulse PSR and a ZVS pulse PZV. For example, during a switching period T1, after the primary side winding W1 is turned ON and OFF (as shown by the falling edge of the switching signal S1C in FIG. 3A, at the timing point t1), the SR-control pulse PSR is configured to operably control the synchronous rectifier switch S2 to be ON for an SR time period T_SR, to perform secondary side synchronous rectification. The SR time period T_SR is substantially synchronous with the conduction time of an induction current of the secondary side winding W2. In other words, the SR time period T_SR begins at a timing point (i.e., the timing point t1) where the induction current starts being generated due to energy is transferred from the primary side winding W1 to the secondary side winding W2, and the SR time period T_SR ends at a timing point (i.e., the timing point t2 in FIG. 3A) where the induction current of the secondary side winding W2 is reduced to zero; thus, the power conversion efficiency can be improved.

Figure 2B:
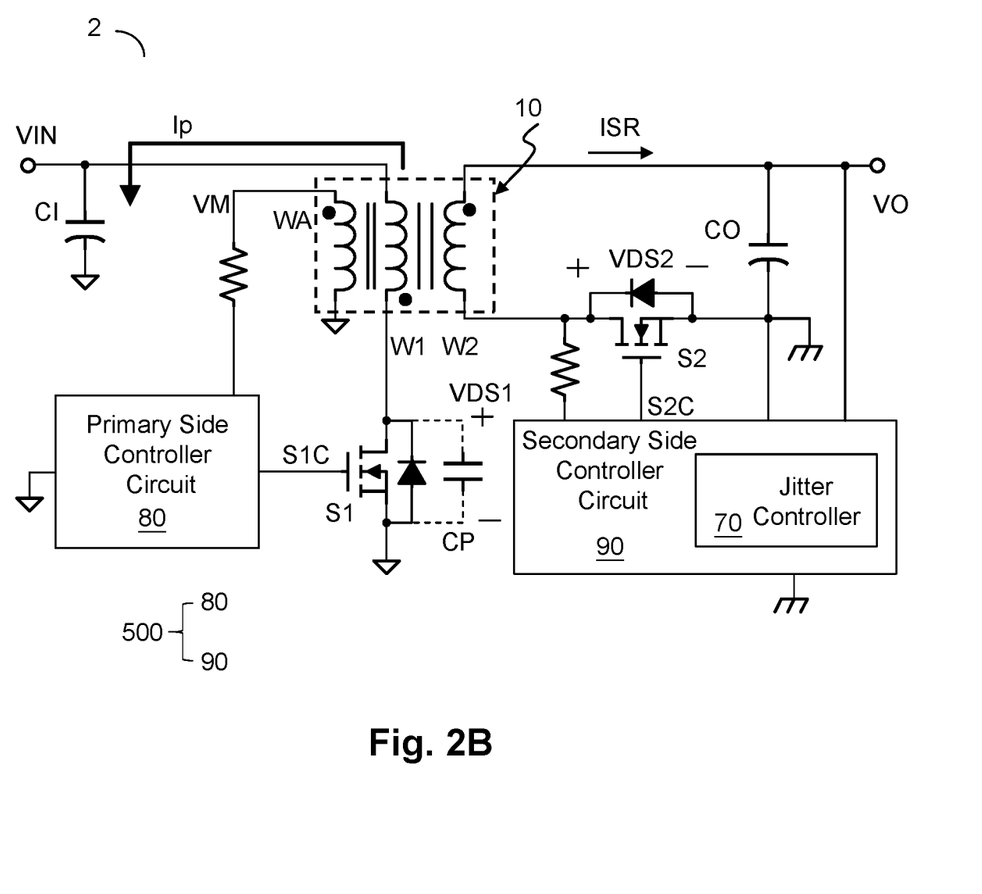

The ZVS pulse PZV is configured to operably achieve zero voltage switching of the primary side switch S1. When the power transformer 10 is demagnetized and the synchronous rectifier switch S2 is turned ON (as shown by the timing point t3 in FIG. 3A) again according to the ZVS pulse PZV during the switching period T1, the power transformer 10 will induce a circulation current Is at the secondary side winding W2 (as shown in FIG. 2A); that is, as shown in FIG. 3A, under a situation where a secondary side current ISR is a negative current (e.g., in a period from the timing point t3 to the timing point t4), the circulation current Is will transfer energy from an output capacitor CO to the secondary side winding W2. Afterward, when the synchronous rectifier switch S2 is turned OFF at a timing point (i.e., as shown by the timing point t4 in FIG. 3A) where the ZVS pulse PZV ends, the power transformer 10 will induce a circulation current Ip at the primary side winding W1 (as shown in FIG. 2B). According to the present invention, the circulation current Ip at the primary side winding W1 can discharge a parasitic capacitor Cp of the primary side switch S1 to substantially 0V, and the charges of the parasitic capacitor Cp will be transferred to an input capacitor CI. Consequently, the primary side switch S1 can achieve zero voltage switching (ZVS) when the primary side switch S1 is turned ON in a next cycle (e.g., a switching period T2 which begins at the timing point t5 shown in FIG. 3A) and in further cycles.

As understood by one of average skill in the art, the term "zero voltage switching", as may be used herein, is meant to indicate: before a transistor (such as the primary side switch S1) is turned ON, the residual voltage of the parasitic capacitor of the transistor is discharged to substantially 0V by a discharging current through an energy storage path (e.g., corresponding to the primary side winding W1), and the charges of the parasitic capacitor are transferred to an energy storage device (such as the input capacitor CI), such that when the transistor (e.g., the primary side switch S1) is turned ON, the drain-source voltage of the transistor has been reduced to substantially 0V. Since the charges on the parasitic capacitor is not discharged through the transistor which has a conduction resistance, the power conversion efficiency can be improved.

Note that, although the parasitic capacitor being discharged to 0V is preferred, however due to non-idealities caused by for example imperfection of components or imperfect matching among components, the voltage of the parasitic capacitor may not be discharged exactly to 0V, but just close to 0V. In other words, according to the present invention, a certain level of error between 0V and the voltage on the parasitic capacitor after discharge is acceptable, and therefore the term. "substantially" is used to mean that an insignificant error within a tolerable range is acceptable.

In one embodiment, the ZVS control circuit of the present invention is configured to operably control a flyback power converter to operate under a discontinuous conduction mode (DCM). More particularly, under a discontinuous conduction mode (DCM), the present invention can, via a ringing signal of a ringing current which is related to the power transformer 10, synchronize the above-mentioned switching signal S1C and the ZVS pulse PZV, thereby achieving zero voltage switching of the primary side switch S1. The details as to how this is achieved will be explained later.

As understood by one of average skill in the art, the term "ringing current", as may be used herein, is meant to indicate: under a situation where the flyback power converter operates under DCM, after the SR-control pulse PSR ends (i.e., under a situation where the secondary side current ISR is reduced to zero, as shown by the timing point t2 in FIG. 3A), a resonance having a ringing period will be generated among the windings of the power transformer 10 and the capacitors and parasitic capacitors coupled to the windings, to generate a ringing current on each winding. During the period wherein a ringing current is generated, a signal related to such ringing current can be obtained via a primary side voltage VDS1 and/or a secondary side voltage VDS2; such signal related to the ringing current is referred to as a "ringing signal" in this specification. The primary side voltage VDS1 refers to a voltage between a current in-flow terminal and a current out-flow terminal of the primary side switch S1, whereas, the secondary side voltage VDS2 refers to a voltage between a current in-flow terminal and a current out-flow terminal of the synchronous rectifier switch S2. Form one perspective, in one embodiment, the ringing signal includes the primary side voltage VDS1 and/or the secondary side voltage VDS2. It is noteworthy that, under a situation where the power transformer 10 and other devices operate under a constant and stable condition, the ringing period of the ringing signal is substantially a constant. Accordingly, the present invention can adopt the ringing signal to synchronize the switching signal S1C and the ZVS pulse PZV. However, the present invention is not limited to this, and the switching signal S1C can be generated according to other mechanisms.

Please still refer to FIG. 3A. In one embodiment, after the SR-control pulse PSR ends, on one hand, the primary side controller circuit 80 determines a trigger timing point of a next switching signal S1C according to a first waveform characteristic of the ringing signal, to control the next turned-ON timing point of the primary side switch S1; on the other hand, after the SR-control pulse PSR ends, the secondary side controller circuit 90 determines a trigger timing point of a following ZVS pulse PZV according to a second waveform characteristic of the ringing signal and a jitter signal, to control the synchronous rectifier switch S2 to be turned ON for a predetermined ZVS time period T_ZVS after the synchronous rectifier switch S2 has been turned ON for a SR time period T_SR, so as to achieve zero voltage switching of the primary side switch S1. The primary side controller circuit 80 or the secondary side controller circuit 90 includes a jitter controller 70 (in the embodiment shown in FIG. 2A, a jitter controller 70 is included in the secondary side controller circuit 90). The jitter controller 70 is configured to operably generate a jitter signal for performing jitter control on the ZVS pulse PZV.

In one embodiment, the above-mentioned first waveform characteristic or second waveform characteristic can be, for example but not limited to, a peak, a valley, a rising edge or a falling edge of the ringing signal. Or, in another embodiment, the above-mentioned first waveform characteristic or second waveform characteristic can be, for example but not limited to, a waveform characteristic related to a slope of the ringing signal.

Please still refer to FIG. 3A. In one specific embodiment, the switching signal S1C controls the primary side switch S1 according to a first waveform characteristic of the ringing signal, so that the primary side switch S1 operates by a switching period (e.g., as shown by the switching periods T1, T2 and T3 in FIG. 3A). More specifically, for example, the trigger timing point of the switching signal S1C is synchronous with a valley or a falling edge of the primary side voltage VDS1. In one embodiment, preferably, as shown in FIG. 3A, the trigger timing point of the switching signal S1C is synchronous with a valley of the primary side voltage VDS1, so that the power conversion efficiency can be further improved. However, the present invention is not limited to this, and the switching signal S1C can be generated according to other mechanisms.

More specifically, referring to FIG. 3A, the trigger timing point of the switching signal S1C (to start the switching period T2) is synchronous with the second valley v2 during the switching period T1 of the primary side voltage VDS1. Or, the trigger timing point of the switching signal S1C (to start the switching period T3) is synchronous with the third valley v3 during the switching period T2 of the primary side voltage VDS1. Or, the trigger timing point of the switching signal S1C (to start the switching period next to the switching period T3) is synchronous with the third valley v3 during the switching period T3 of the primary side voltage VDS1. In practical application, it is possible for the trigger timing point of the switching signal S1C to be shifted later or earlier as the input voltage VIN or load varies, or as the setting of the output voltage varies. Nevertheless, according to the above-mentioned mechanism of the present invention, the trigger timing point of the switching signal S1C is controlled to be synchronous with a first waveform characteristic of the ringing signal such as a valley or a falling edge of the primary side voltage VDS1.

Please still refer to FIG. 3A. In one embodiment, during a present switching period, the trigger timing point of the ZVS pulse PZV can be determined by: first detecting a predetermined number of occurrences of second waveform characteristics of the ringing signal, and then deciding the trigger timing point of the ZVS pulse PZV according to the detection result and the jitter signal (thereby performing jitter control on the ZVS pulse PZV). The above-mentioned "predetermined number of occurrences" is related to the number of the first waveform characteristic or the number of the second waveform characteristic in a previous switching period preceding the present switching period. Consequently, under a steady state, the trigger timing point of the ZVS pulse PZV is earlier than the trigger timing point of the switching signal S1C by a predetermined time difference, so as to ensure achieving zero voltage switching of the primary side switch S1.

In one specific embodiment, during a present switching period, the trigger timing point of the ZVS pulse PZV can be determined by: first detecting a predetermined number of occurrences of peaks or rising edges of the primary side voltage VDS1, and then deciding the trigger timing point of the ZVS pulse PZV according to the detection result and the jitter signal (thereby performing jitter control on the ZVS pulse PZV). In this embodiment, the "predetermined number of occurrences" is a total number of valleys or falling edges of the primary side voltage VDS1 in the previous switching period minus one.

Please still refer to FIG. 3A. In more detail, if T2 is the "present switching period", then T1 is the "previous switching period". As shown in FIG. 3A, during the previous switching period T1, the total number of valleys of the primary side voltage VDS1 is two (i.e., the valley v1 and the valley v2 during T1). Hence, in the present switching period T2, the trigger timing point of the ZVS pulse PZV is determined by the timing point of the occurrence of the first peak of the primary side voltage VDS1 (because during the previous switching period T1, the total number of valleys or falling edges of the primary side voltage VDS1 is two and because two minus one is equal to one, during the present switching period T2, the first peak is adopted), modified by the jitter signal. In another case, when T3 is the present switching period, then T2 is the previous switching period; as shown in FIG. 3A, during the previous switching period T2, a total number of valleys of the primary side voltage VDS1 is three (i.e., the valley v1, the valley v2 and the valley v3 during T2). Hence, in the present switching period T3, the trigger timing point of the ZVS pulse PZV is determined by the timing point of the occurrence of the second peak of the primary side voltage VDS1 of the primary side voltage VDS1 (because during the previous switching period T2, the total number of valleys or falling edges of the primary side voltage VDS1 is three and because three minus one is equal to two, during the present switching period T3, the second peak is adopted), modified by the jitter signal.

In the above-mentioned specific embodiment, the trigger timing point of the switching signal S1C is synchronous with a valley (i.e., the first waveform characteristic) of the primary side voltage VDS1, and the trigger timing point of the ZVS pulse PZV is determined according to the timing point of the occurrence of a predetermined number of peaks (i.e., the second waveform characteristic) of the primary side voltage VDS1. Because the predetermined number is related to a total number of valleys (i.e., the first waveform characteristic) in the previous switching period, (wherein in one preferable embodiment the predetermined number is the total number of valleys in the previous switching period minus one), when the flyback power converter 2 operates under a steady state, the trigger timing point of the ZVS pulse PZV can be ensured earlier than the trigger timing point of the switching signal S1C by a predetermined time difference, to ensure achieving zero voltage switching of the primary side switch S1. It is noteworthy that, in one embodiment, the above-mentioned predetermined time difference is related to a ringing period of the ringing signal. In one embodiment, as shown in FIG. 3A, under a steady state, the above-mentioned predetermined time difference can be, for example but not limited to, about one-forth (i.e., ¼) of a ringing period plus the predetermined ZVS time period T_ZVS, for example as shown by the time difference between an ending timing point of the ZVS pulse PZV and the timing point of the third valley v3 during the switching period T3.

While a specific embodiment has been described in the above, it should be understood that by using different first and/or second waveform characteristics and/or different predetermined numbers, different predetermined time differences will be obtained. In different embodiments, such different predetermined time differences can be related to, for example but not limited to, one-eighth (i.e., ⅛), one-second (i.e., ½), three-forth (i.e., ¾), or one ringing period, or a combination of the above. Those skilled in this art should readily conceive variations and modifications within the spirit of the present invention, so the details thereof are not redundantly explained here.

From a broader perspective, the secondary side controller circuit 90 determines a basic timing of the trigger timing point of the ZVS pulse PZV according to the second waveform characteristic, so as to control the synchronous rectifier switch S2 to be turned ON for a predetermined ZVS time period T_ZVS before the primary side switch S1 is turned ON (and the "basic timing of the trigger timing point" of the ZVS pulse PZV can be modified according to the jitter signal to become the final trigger timing point of the ZVS pulse PZV). Thus, under a steady state, the trigger timing point of the ZVS pulse PZV can be ensured earlier than the trigger timing point of the switching signal S1C by a predetermined time difference, to ensure achieving zero voltage switching of the primary side switch S1.

As mentioned above, it is possible for the trigger timing point of the switching signal S1C to be shifted later or earlier as the power condition or load condition varies. In one embodiment, during the present switching period, when the basic timing of the trigger timing point of the ZVS pulse PZV is later than the trigger timing point of the switching signal S1C, the ZVS pulse PZV will not be triggered. In other words, under such circumstance, during the present switching period, the ZVS pulse PZV is omitted and is not triggered. However, this is only a transient state and after several switching periods, the above-mentioned control mechanism will still trigger the ZVS pulse PZV.

In one embodiment, in order not to cause the ZVS pulse PZV to overlap with the switching signal S1C, the criteria to omit the ZVS pulse PZV can be broadened to: not to trigger the ZVS pulse PZV when a time difference between an intended trigger timing point of the ZVS pulse PZV and a trigger timing point of the switching signal S1C is smaller than a time threshold.

On the other hand, as shown in FIG. 3A, in the switching period T2, the trigger timing point of the switching signal S1C is delayed (as compared to the switching period T1) for example due to the power condition or the load condition, and thus in the switching period T2, the time difference between the trigger timing point of the ZVS pulse PZV and the trigger timing point of the switching signal S1C is equal to 1.5-fold of the ringing period plus the predetermined ZVS time period T_ZVS. Although such condition will somewhat degrade the efficacy for achieving zero voltage switching of the primary side switch S1 in the switching period T2, nevertheless, this is only a transient state and after several switching periods, the system will restore to the steady state (e.g., in the switching period T3). In other words, the system will be restored to a relationship wherein the trigger timing point of the ZVS pulse PZV is earlier than the trigger timing point of the switching signal S1C by a predetermined time difference (e.g., as shown by the relationship in the switching period T3), thereby achieving zero voltage switching of the primary side switch S1.

Please still refer to FIG. 3A. As mentioned above, in one embodiment, the ringing signal can be the secondary side voltage VDS2. In this case, the basic timing of the trigger timing point of the following ZVS pulse PZV can be determined according to the secondary side voltage VDS2. As shown in FIG. 3A, in one embodiment, during the present switching period (e.g., the switching period T3), the basic timing of the trigger timing point of the ZVS pulse PZV can be determined by detecting the occurrence of a predetermined number of valleys (i.e., as shown by the second valley v2 during T3) or falling edges of the secondary side voltage VDS2. In this embodiment, the "predetermined number" a total number of valleys or falling edges of the secondary side voltage VDS2 during the previous switching period (e.g., the switching period T2; during the switching period T2, a total number of valleys of the secondary side voltage VDS2 is two).

Because there is a certain relationship among the voltages of the windings of a transformer, information regarding the primary side voltage VDS1 can be obtained through another winding (e.g., the secondary side winding W2 or any other winding such as an auxiliary winding WA) of the power transformer 10. That is, equivalently, the primary side voltage VDS1 can be obtained through the secondary side voltage VDS2 or an auxiliary winding WA (referring to FIG. 2A).

In one specific embodiment, the peak or rising edge of the ringing signal can be detected by detecting whether the ringing signal rises up to a first voltage threshold. In another specific embodiment, the valley or falling edge of the ringing signal can be detected by detecting whether the ringing signal falls down to a second voltage threshold.

Please still refer to FIG. 3A. In one embodiment, in the case that the ringing signal is the primary side voltage VDS1, the first voltage threshold corresponding to the primary side voltage VDS1 can be, for example but not limited to, the voltage threshold VT1H shown in FIG. 3A. In one embodiment, the voltage threshold VT1H is related to the input voltage VIN. That is, for example, in one embodiment, the voltage threshold VT1H can be equal to the input voltage VIN. Or, in another embodiment, the voltage threshold VT1H can be equal to the input voltage VIN plus an offset value, so that the voltage threshold VT1H will be higher than the input voltage VIN. Under such situation, the voltage threshold VT1H is closer to the peak of the primary side voltage VDS1.

Please still refer to FIG. 3A. In one embodiment, in the case that the ringing signal is the primary side voltage VDS1, the second voltage threshold corresponding to the primary side voltage VDS1 can be, for example but not limited to, the voltage threshold VT1L shown in FIG. 3A. In one embodiment, the voltage threshold VT1L is related to the input voltage VIN. That is, for example, in one embodiment, the voltage threshold VT1L can be equal to the input voltage VIN. Or, in another embodiment, the voltage threshold VT1L can be equal to the input voltage VIN minus an offset value, so that the voltage threshold VT1L will be lower than the input voltage VIN. Under such situation, the voltage threshold VT1L is closer to the valley of the primary side voltage VDS1.

The above-mentioned approaches to detect a peak, a valley, a rising edge or a falling edge of the primary side voltage VDS1 can be similarly applied to detecting a peak, a valley, a rising edge or a falling edge of the secondary side voltage VDS2.

Please still refer to FIG. 3A. For example, in one embodiment, in the case that the ringing signal is the secondary side voltage VDS2, the second voltage threshold corresponding to the secondary side voltage VDS2 can be, for example but not limited to, the voltage threshold VT2L shown in FIG. 3A. In one embodiment, the voltage threshold VT2L is related to the output voltage VO. That is, for example, in one embodiment, the voltage threshold VT2L can be equal to the output voltage VO. Or, in another embodiment, the voltage threshold VT2L can be equal to a divided voltage of the output voltage VO, so that the voltage threshold VT2L will be lower than the output voltage VO. Under such situation, the voltage threshold VT2L is closer to the valley of the secondary side voltage VDS2.

It is noteworthy that, when the flyback power converter 2 operates under a steady state, it can be anticipated that the basic timing of trigger timing point of the ZVS pulse PZV and the switching timing point of the switching signal S1C will occur at substantially fixed timing points within the present switching period. That is, the switching frequency of the flyback power converter 2 will be a constant; however, this will result in an undesirably greater electromagnetic interference (EMI) caused by electromagnetic effect generated due to operation of the flyback power converter 2. Please refer to FIG. 3D, which shows a spectrum of an EMI signal generated during operation of the flyback power converter 2 wherein the ZVS pulse is not subject to jitter control, and a spectrum of an EMI signal generated during operation of the flyback power converter 2 wherein the ZVS pulse is subject to jitter control, respectively. In the case that the basic timing of trigger timing point of the ZVS pulse PZV is a constant, the EMI signal will be generated at a specific frequency (generally, this specific frequency corresponds to the above-mentioned switching frequency), having a strong intensity, as shown by the dashed-line waveform in FIG. 3D. The X-axis of FIG. 3D denotes the frequency, whereas, the Y-axis of FIG. 3D denotes the intensity of the EMI signal (which can be expressed in the unit of decibel (db) or in the unit of volt(V)).

To mitigate the EMI problem, according to the present invention, a jitter controller is provided (in the embodiment of FIG. 2A, a jitter controller 70 is included in the secondary side controller circuit 90). The jitter controller 70 is configured to operably generate a jitter signal for performing jitter control on the ZVS pulse PZV, whereby the EMI signal is subject to a spectrum-spreading operation so that the EMI signal does not focus on a specific frequency, thereby reducing the electromagnetic interference. As shown by the solid-line waveform in FIG. 3D, when the ZVS pulse is subject to jitter control, the EMI signal is scattered over a wider range of spectrum. The EMI signal for example is caused by the operation of the primary side winding, the secondary side winding and/or the auxiliary winding.

Figure 3B:
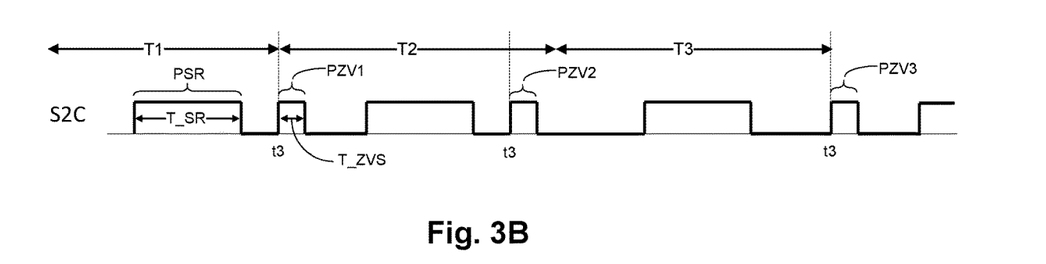
FIG. 3B and FIG. 3C show a synchronous rectifier (SR) control signal wherein the ZVS pulse is not subject to jitter control and a SR control signal wherein the ZVS pulse is subject to jitter control, respectively.
Figure 3C:
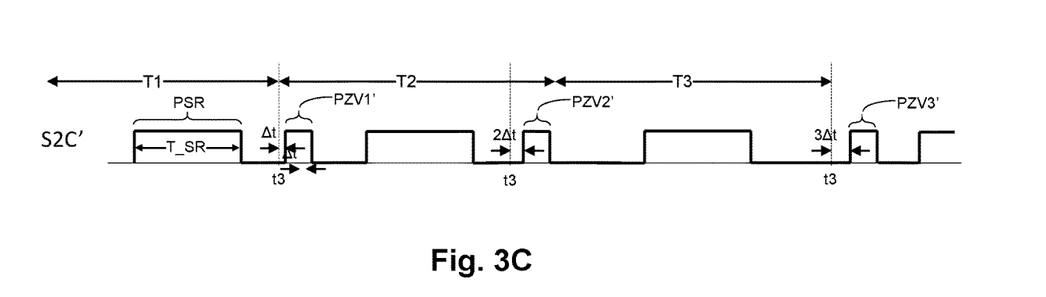
Figure 3D:
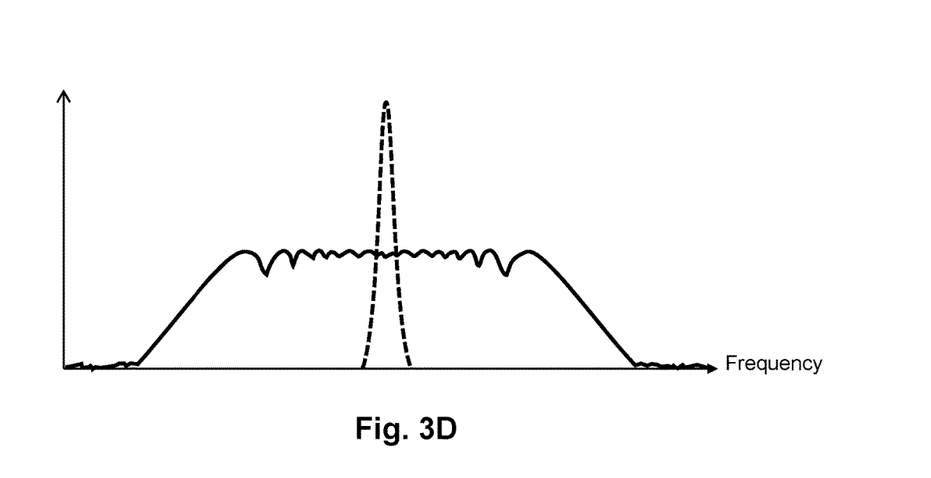
FIG. 3D shows a spectrum of an electromagnetic interference signal wherein the ZVS pulse is not subject to jitter control and a spectrum of an electromagnetic interference signal wherein the ZVS pulse is subject to jitter control, respectively.

The jitter control on the ZVS pulse PZV via a jitter signal can be achieved by many ways. For example, the jitter controller (such as the jitter controller 70 in FIG. 2A) can generate the jitter signal randomly (or pseudo-randomly), and/or by a predetermined time sequence. The jitter signal can perform jitter control on, for example but not limited to, the trigger timing point of the ZVS pulse PZV. Please refer to FIG. 3C along with FIG. 3B. FIG. 3B shows a SR control signal S2C wherein the ZVS pulses PZV1, PZV2 and PZV3 are not subject to jitter control. FIG. 3C shows a SR control signal S2C' wherein the ZVS pulses PZV1', PZV2' and PZV3' are subject to jitter control. In one embodiment, as shown in FIG. 3C, the jitter controller 70 can generate the jitter signal for example by a predetermined time sequence. The jitter signal performs jitter control on the trigger timing points of the ZVS pulses PZV1', PZV2' and PZV3', respectively. As a result, during the switching periods T1, T2 and T3, the respective corresponding trigger timing points of the ZVS pulses PZV1', PZV2' and PZV3' are the timing point t3 plus Δt, the timing point t3 plus 2Δt and a the timing point t3 plus 3Δt, respectively. Certainly, it should be understood that the above-mentioned combination of the time sequence and the number of Δt in the above-mentioned preferred embodiment is only an illustrative example, but not for limiting the scope of the present invention. In other embodiments, it is also practicable and within the scope of the present invention that the jitter controller 70 can generate the jitter signal via any other predetermined time sequence, a random time sequence or a pseudorandom time sequence. Besides, the jitter control is not limited to being in a discrete form; in other embodiments, the jitter control can be in a continuous form.

Certainly, it should be understood that the approach for performing jitter control on the ZVS pulse PZV via a jitter signal is not limited to the above-mentioned embodiments. In other embodiments, it is within the scope of the present invention as long as a jitter signal can perform jitter effect on a trigger timing point of the ZVS pulse PZV, to spread the spectrum of the EMI signal (for example as shown by the solid-line waveform in FIG. 3D). In one embodiment, a jitter signal generated by the jitter controller 70 can perform jitter control on a characteristic threshold of the waveform characteristic. The characteristic threshold can be, for example but not limited to, the above-mentioned voltage threshold VT1H, voltage threshold VT1L or voltage threshold VT2L. In other words, by performing jitter control on the voltage threshold VT1H, the voltage threshold VT1L or the voltage threshold VT2L, a jitter effect on a trigger timing point of the ZVS pulse PZV will be obtained, which can achieve the effect of spreading the spectrum of the EMI signal.

Figure 4:
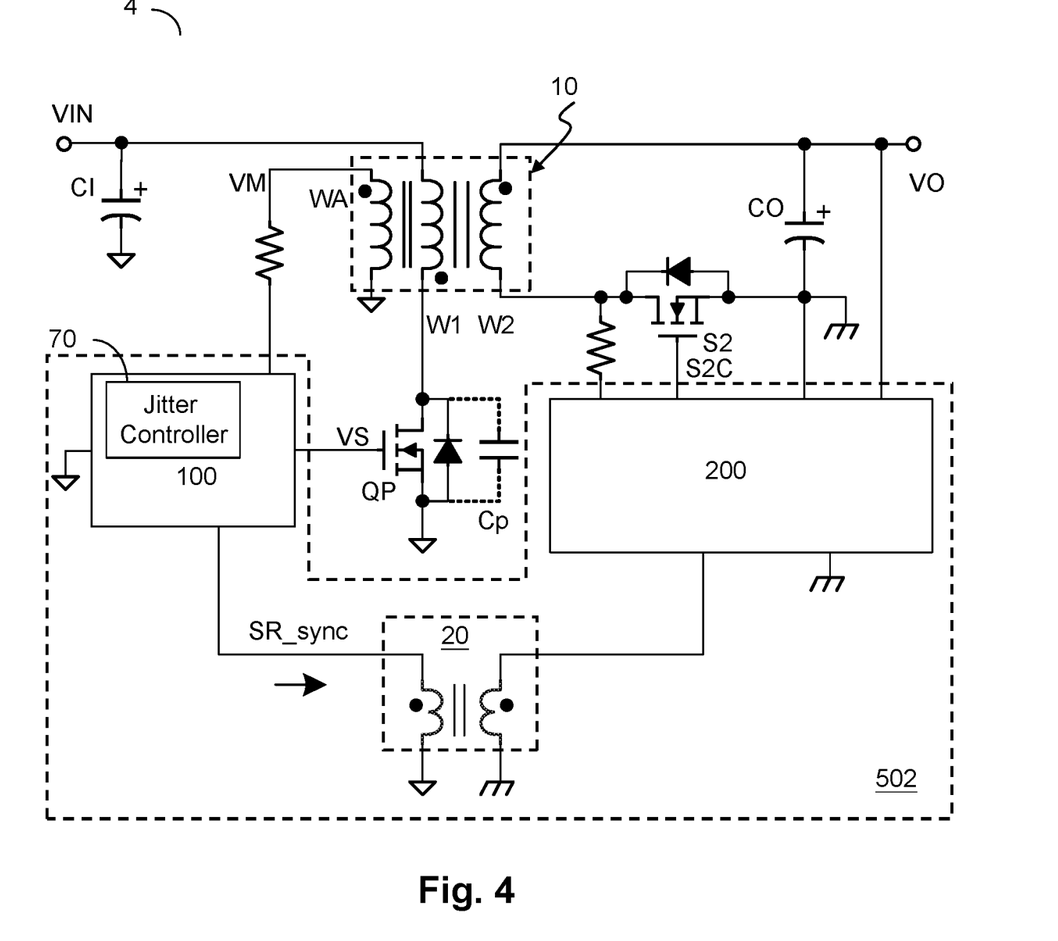
FIG. 4 shows a schematic diagram of a flyback power converter according to another embodiment of the present invention.

Please refer to FIG. 4, which shows a schematic diagram of a flyback power converter (i.e., a flyback power converter 4) comprising a ZVS control circuit (i.e., a ZVS control circuit 502) according to another embodiment of the present invention. In this embodiment, a pulse transformer 20 couples the SR synchronous signal SR sync from the primary side controller circuit 100 to the secondary side controller circuit 200 to generate the SR control signal S2C. Also referring to FIG. 3A, more specifically, the SR control signal S2C is triggered to generate the ZVS pulse PZV according to the SR synchronous signal SR sync. This embodiment shows that the jitter controller 70 is not limited to being included in the secondary side controller circuit 90 as shown in FIG. 2A and FIG. 2B, but instead can be included in a primary side controller circuit (as shown by the primary side controller circuit 100 in FIG. 4). Through the pulse transformer 20, the SR synchronous signal SR sync is coupled from the primary side controller circuit 100 to the secondary side controller circuit 200 to generate the SR control signal S2C, so that this embodiment can perform jitter control on the ZVS pulse PZV.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described herein before to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A zero voltage switching (ZVS) control circuit for use in a flyback power converter, the flyback power converter being configured to operably convert an input voltage to an output voltage, the ZVS control circuit comprising:

a primary side controller circuit, which is configured to operably generate a switching signal to control a primary side switch, thereby controlling a primary side winding of a power transformer of the flyback power converter, wherein the primary side winding is coupled to the input voltage; and a secondary side controller circuit, which is configured to operably generate a synchronous rectifier (SR) control signal for controlling a synchronous rectifier switch, thereby controlling a secondary side winding of the power transformer to generate the output voltage, wherein the SR control signal includes an SR-control pulse and a ZVS pulse, wherein the SR-control pulse is configured to operably control the synchronous rectifier switch to be ON for an SR time period, to perform secondary side synchronous rectification;

wherein, after the SR-control pulse ends, the secondary side controller circuit determines a trigger timing point of the ZVS pulse according to a waveform characteristic of a ringing signal, to control the synchronous rectifier switch to be ON for a predetermined ZVS time period, for achieving zero voltage switching of the primary side switch;

wherein the ringing signal is related to a ringing current of the power transformer;

wherein the primary side controller circuit or the secondary side controller circuit includes a jitter controller, which is configured to operably generate a jitter signal for performing jitter control on the ZVS pulse.

2. The ZVS control circuit of claim 1, wherein the jitter controller generates the jitter signal via a random way, a pseudorandom way and/or by predetermined time sequence.

3. The ZVS control circuit of claim 1, wherein the secondary side controller circuit determines the trigger timing point of the ZVS pulse according to the waveform characteristic, so as to control the synchronous rectifier switch to be ON for the predetermined ZVS time period before the primary side switch is turned ON, so that under a steady state, the trigger timing point of the ZVS pulse is earlier than a trigger timing point of the switching signal by a predetermined time difference, for achieving zero voltage switching of the primary side switch; wherein the predetermined time difference is related to a ringing period of the ringing signal.

4. The ZVS control circuit of claim 1, wherein the flyback power converter operates under a discontinuous conduction mode (DCM).

5. The ZVS control circuit of claim 1, wherein the waveform characteristic includes a peak, a valley, a rising edge or a falling edge of the ringing signal.

6. The ZVS control circuit of claim 1, wherein the jitter controller performs jitter control on the trigger timing point of the ZVS pulse.

7. The ZVS control circuit of claim 1, wherein the jitter controller performs jitter control on a characteristic threshold of the waveform characteristic.

8. The ZVS control circuit of claim 1, wherein the ringing signal includes a primary side voltage and/or a secondary side voltage, wherein the primary side voltage is a voltage between a current in-flow terminal and a current out-flow terminal of the primary side switch, whereas, the secondary side voltage is a voltage between a current in-flow terminal and a current out-flow terminal of the synchronous rectifier switch.

9. The ZVS control circuit of claim 8, wherein the primary side voltage is obtained through a winding of the power transformer other than the primary side winding of the power transformer.

10. The ZVS control circuit of claim 8, wherein the primary side controller circuit includes the jitter controller, wherein the jitter signal is transmitted to the secondary side controller circuit via a pulse transformer.

11. A flyback power converter, which is configured to operably convert an input voltage to an output voltage, the flyback power converter comprising:
a power transformer coupled between the input voltage and the output voltage;
a primary side switch coupled to a primary side winding of the power transformer, wherein the primary side winding is coupled to the input voltage;
a synchronous rectifier switch coupled to a secondary side winding of the power transformer, wherein the secondary side winding is coupled to the output voltage; and
a zero voltage switching (ZVS) control circuit including:
a primary side controller circuit, which is configured to operably generate a switching signal to control a primary side switch, thereby controlling a primary side winding of a power transformer of the flyback power converter, wherein the primary side winding is coupled to the input voltage; and
a secondary side controller circuit, which is configured to operably generate a synchronous rectifier (SR) control signal for controlling a synchronous rectifier switch, thereby controlling a secondary side winding of the power transformer to generate the output voltage, wherein the SR control signal includes an SR-control pulse and a ZVS pulse, wherein the SR-control pulse is configured to operably control the synchronous rectifier switch to be ON for an SR time period, to perform secondary side synchronous rectification;
wherein, after the SR-control pulse ends, the secondary side controller circuit determines a trigger timing point of the ZVS pulse according to a waveform characteristic of a ringing signal, to control the synchronous rectifier switch to be ON for a predetermined ZVS time period, for achieving zero voltage switching of the primary side switch;
wherein the ringing signal is related to a ringing current of the power transformer;
wherein the primary side controller circuit or the secondary side controller circuit includes a jitter controller, which is configured to operably generate a jitter signal for performing jitter control on the ZVS pulse.

12. The flyback power converter of claim 11, wherein the jitter controller generates the jitter signal via a random way, a pseudorandom way and/or by a predetermined time sequence.

13. The flyback power converter of claim 11, wherein the secondary side controller circuit determines the trigger timing point of the ZVS pulse according to the waveform characteristic, so as to control the synchronous rectifier switch to be ON for the predetermined ZVS time period before the primary side switch is turned ON, so that under a steady state, the trigger timing point of the ZVS pulse is earlier than a trigger timing point of the switching signal by a predetermined time difference, for achieving zero voltage switching of the primary side switch; wherein the predetermined time difference is related to a ringing period of the ringing signal.

14. The flyback power converter of claim 11, wherein the flyback power converter operates under a discontinuous conduction mode (DCM).

15. The flyback power converter of claim 11, wherein the waveform characteristic includes a peak, a valley, a rising edge or a falling edge of the ringing signal.

16. The flyback power converter of claim 11, wherein the jitter controller performs jitter control on the trigger timing point of the ZVS pulse.

17. The flyback power converter of claim 11, wherein the jitter controller performs jitter control on a characteristic threshold of the waveform characteristic.

18. The flyback power converter of claim 11, wherein the ringing signal includes a primary side voltage and/or a secondary side voltage, wherein the primary side voltage is a voltage between a current in-flow terminal and a current out-flow terminal of the primary side switch, whereas, the secondary side voltage is a voltage between a current in-flow terminal and a current out-flow terminal of the synchronous rectifier switch.

19. The flyback power converter of claim 18, wherein the primary side voltage is obtained through a winding of the power transformer other than the primary side winding of the power transformer.

20. The flyback power converter of claim 11, wherein the primary side controller circuit includes the jitter controller, and wherein the jitter signal is transmitted to the secondary side controller circuit via a pulse transformer.

21. A control method for controlling a flyback power converter to convert an input voltage to an output voltage, the control method comprising:
   generating a switching signal to control a primary side switch, thereby controlling a primary side winding of a power transformer, wherein the primary side winding is coupled to the input voltage;
   generating a synchronous rectifier (SR) control signal for controlling a synchronous rectifier switch, thereby controlling a secondary side winding of the power transformer to generate the output voltage, wherein the SR control signal includes an SR-control pulse and a ZVS pulse, wherein the SR-control pulse is configured to operably control the synchronous rectifier switch to be ON for an SR time period, to perform secondary side synchronous rectification; and
   performing jitter control on the ZVS pulse;
   wherein the step of generating the SR control signal includes:
      determining a trigger timing point of the ZVS pulse according to a waveform characteristic of a ringing signal, to control the synchronous rectifier switch to be ON for a predetermined ZVS time period, for achieving zero voltage switching of the primary side switch;
      wherein the ringing signal is related to a ringing current of the power transformer.

22. The control method of claim 21, wherein the step of performing jitter control on the ZVS pulse includes:
   generating the jitter signal via a random way, a pseudo-random way and/or by a predetermined time sequence, to perform jitter control on the ZVS pulse.

23. The control method of claim 21, wherein the step of determining the trigger timing point of the ZVS pulse according to the waveform characteristic of the ringing signal for controlling the synchronous rectifier switch to be ON for the predetermined ZVS time period includes:
   determining the trigger timing point of the ZVS pulse according to the waveform characteristic, so as to control the synchronous rectifier switch to be ON for the predetermined ZVS time period before the primary side switch is turned ON, so that under a steady state, the trigger timing point of the ZVS pulse is earlier than a trigger timing point of the switching signal by a predetermined time difference, for achieving zero voltage switching of the primary side switch; wherein the predetermined time difference is related to a ringing period of the ringing signal.

24. The control method of claim 21, wherein the flyback power converter operates under a discontinuous conduction mode (DCM).

25. The control method of claim 21, wherein the waveform characteristic includes a peak, a valley, a rising edge or a falling edge of the ringing signal.

26. The control method of claim 21, wherein the step of performing jitter control on the ZVS pulse includes:
   performing jitter control on the trigger timing point of the ZVS pulse.

27. The control method of claim 21, wherein the step of performing jitter control on the ZVS pulse includes:
   performing jitter control on a characteristic threshold of the waveform characteristic.

28. The control method of claim 21, wherein the ringing signal includes a primary side voltage and/or a secondary side voltage, wherein the primary side voltage is a voltage between a current in-flow terminal and a current out-flow terminal of the primary side switch, whereas, the secondary side voltage is a voltage between a current in-flow terminal and a current out-flow terminal of the synchronous rectifier switch.

29. The control method of claim 28, wherein the primary side voltage is obtained through a winding of the power transformer other than the primary side winding of the power transformer.

30. The control method of claim 21, further comprising: after the SR-control pulse ends, determining a following trigger timing point of the ZVS pulse according to another waveform characteristic of the ringing signal, to control the primary side switch to be ON again.

* * * * *